United States Patent [19]
Karube et al.

[11] Patent Number: 5,900,171
[45] Date of Patent: May 4, 1999

[54] LASER MACHINING APPARATUS WITH HEAD SUPPORT BY ANGULARLY MOVABLE EXPANDABLE ARMS

[75] Inventors: Norio Karube, Machida; Yoshinori Nakata, Minamitsuru-gun; Kenji Mitsui, Asaka, all of Japan

[73] Assignee: FANUC, Ltd, Yamanashi, Japan

[21] Appl. No.: 08/913,775

[22] PCT Filed: Jan. 24, 1997

[86] PCT No.: PCT/JP97/00160

§ 371 Date: Sep. 23, 1997

§ 102(e) Date: Sep. 23, 1997

[87] PCT Pub. No.: WO97/27023

PCT Pub. Date: Jul. 31, 1997

[30] Foreign Application Priority Data

Jan. 24, 1996 [JP] Japan ................................. 8-28737

[51] Int. Cl.[6] .................................................... B23K 26/08
[52] U.S. Cl. ................................. 219/121.79; 219/121.6; 219/121.67
[58] Field of Search ............................ 219/121.6, 121.67, 219/121.75, 121.78, 121.79, 121.8, 121.81, 121.82

[56] References Cited

U.S. PATENT DOCUMENTS

| | | | |
|---|---|---|---|
| 4,419,820 | 12/1983 | Stumpf | 219/121.67 X |
| 5,053,602 | 10/1991 | Aharon | 219/121.78 |
| 5,231,264 | 7/1993 | Fujita | 219/121.78 |
| 5,560,843 | 10/1996 | Koike et al. | 219/121.67 X |

FOREIGN PATENT DOCUMENTS

| | | | |
|---|---|---|---|
| 0473971 | 3/1992 | European Pat. Off. | 219/121.6 |
| 53-66094 | 6/1978 | Japan | 219/121.67 |
| 60-40682 | 3/1985 | Japan | 219/121.68 |
| 1-306090 | 12/1989 | Japan . | |
| 4-66289 | 3/1992 | Japan | 219/121.6 |
| 5-23877 | 2/1993 | Japan . | |
| 5-329676 | 12/1993 | Japan | 219/121.6 |
| 5-337674 | 12/1993 | Japan | 219/121.78 |
| 6-182576 | 7/1994 | Japan | 219/121.79 |
| 1273983 | 5/1972 | United Kingdom | 219/121.6 |

*Primary Examiner*—Gregory Mills
*Attorney, Agent, or Firm*—Staas & Halsey

[57] ABSTRACT

A laser machining apparatus capable of performing a high-speed and high-precision machining of a workpiece. One end of each of a first-axis and a second-axis expandable arms is supported on a fulcrum. The fulcrum is angularly movably within a predetermined range about the fulcrum in a plane parallel to a machining plane. A machining head is supported at a joint point of the first-axis and second axis expandable arms. Each arm has a ball screw and a cover having an expandable and contractible tube structure, and the machining head has a ball nut threaded to engage with the ball screw. As the ball screw is rotated by a servomotor, the arm extends and contracts to move the machining head. A Z-axis adjusting mechanism is provided between a joint portion of each arm and the machining head and a machining nozzle that is disposed on a tip of the machining head. A three-dimensional parallel drive system or a combination of a serial drive system and a parallel drive system may be used to drive the machining head.

16 Claims, 7 Drawing Sheets

LASER MACHINING APPARATUS WITH HEAD SUPPORT BY ANGULARLY MOVABLE EXPANDABLE ARMS

TECHNICAL FIELD

The present invention relates to a laser machining apparatus for machining a material using laser beam, and more particularly to a laser machining apparatus in which a drive system for moving a machining head is improved.

BACKGROUND ART

Figure 1:
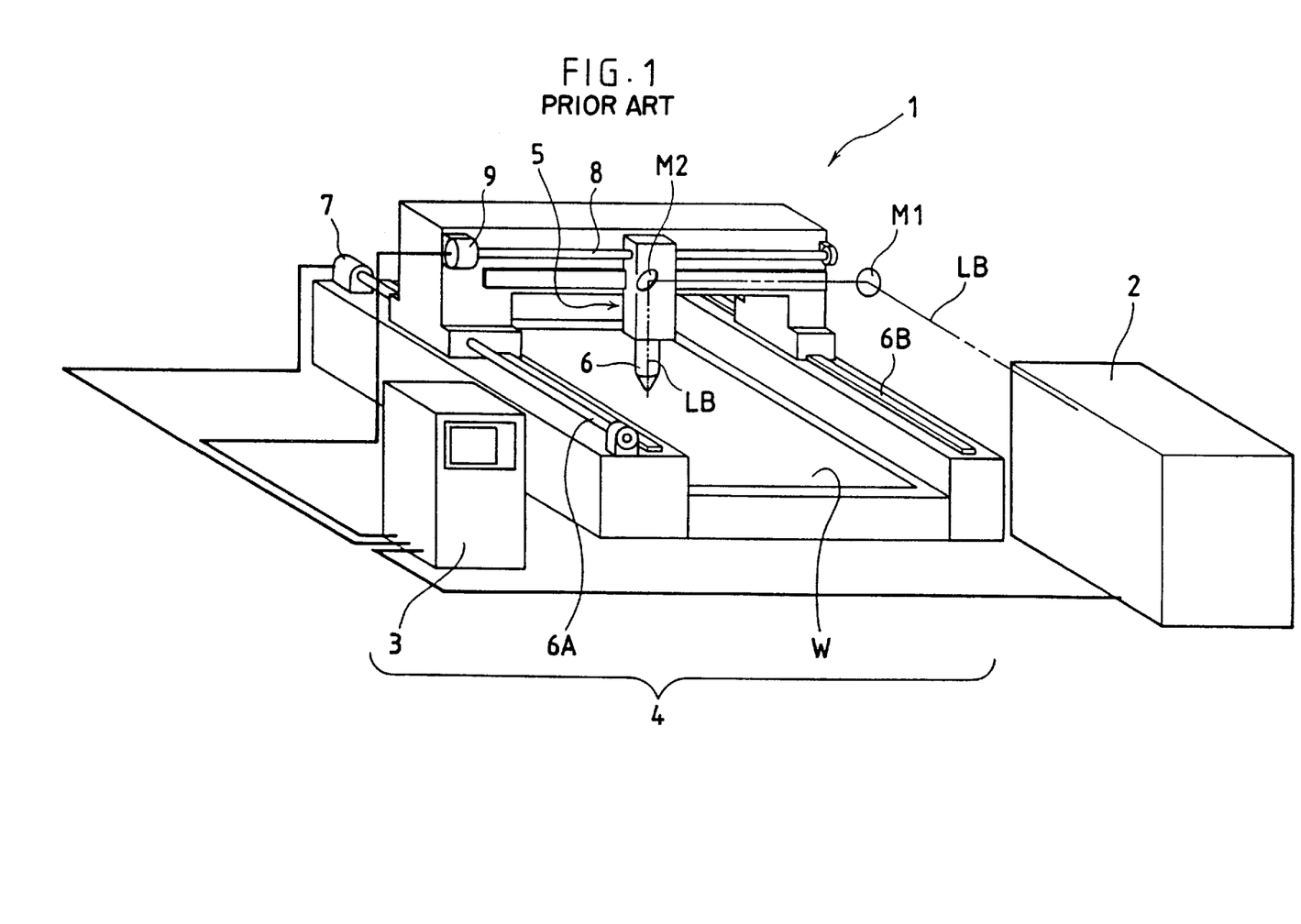
FIG. 1 is a perspective view of a conventional laser machining apparatus utilizing carbon-dioxide gas laser.

A laser machining apparatus for machining, such as cutting, boring, welding, surface-treating, a material using laser beam is advantageous in freely selecting a desired machined shape and is therefore widely used particularly as machining means for manufacturing a little amount of variety of products. FIG. 1 schematically shows a conventional laser beam machine using carbon-dioxide gas.

In FIG. 1, the laser beam machine 1 is equipped with a carbon-dioxide gas laser oscillator 2 as a laser beam supply source. Laser beam LB outputted from the carbon-dioxide gas laser oscillator 2 reaches a main machining unit 4 via a non-illustrated shield-light duct and is then transmitted to a machining head 5 of the main machining unit 4 via mirrors M1, M2.

A condenser lens (not shown) is mounted in the machining head 5 so that the light refracted downwardly by the mirror M2 is gathered and concentrated by the condenser lens, whereupon the concentrated light is projected on a workpiece W from a machining nozzle 6 mounted on a tip of the machining head 5. In order to improve a machining speed and a degree of the machined surface roughness, it has been a common practice to blow assist gas to the machining surface from an assist gas nozzle attached to the machining head 5.

A machining point on which laser beam LB strikes is disposed just under a machining nozzle 6 of the machining head 5. Accordingly, the position of this machining point is determined by positioning the machining head 5 with respect to the X axis and the Y axis. In order to obtain a desired shape of the machined workpiece, the machining head 5 is mounted on an X-Y drive mechanism. The X-Y drive mechanism is a mechanism for moving the machining head 5 in a straight line in ±X-axis direction and ±Y-axis direction and typically comprises a ball screw 6A for X-axis driving, a linear bearing 6B, a servo motor 7, a ball screw 8 for Y-axis driving, and a servo motor 9.

Each servo motor 7, 9 is usually controlled by a computerized numerical controller (CNC) 3. As a playback operation is carried out after teaching a machining program to the numerical controller 3, the machining head 5 is positioned at positions on X-axis and Y-axis (or X-axis, Y-axis and Z-axis positions) in order corresponding to position data contained in the machining program so that machining is accomplished according to the desired shape designated by the machining program.

The Z-axis position of the machining head 5 is often made adjustable independently by a suitable Z-axis moving mechanism. Alternatively, the same control as the X-axis and Y-axis control may be performed using a servo motor and a numerical controller. Instead of moving the machining head 5 by the X-Y drive mechanism, it is also known to move a worktable for mounting a workpiece by the X-Y drive mechanism.

However, the conventional laser machining apparatus utilizing the above-mentioned serial X-Y drive system is not advantageous in quickly moving the machining point as its machining speed is low as compared to other machining tools such as punch press. Namely, if the machining head is moved at a high speed, the degree of rigidity of various constituent members does not conform such high-speed moving so that only inadequate machining accuracy can be achieved. If the degree of rigidity of the individual constituent members was increased in an effort to avoid lowering of the machining accuracy, the load on the drive mechanism would have increased in moving the machining head, which requires a large-sized drive mechanism and hence cannot be a practical solution.

DISCLOSURE OF INVENTION

An object of the present invention is to provide a laser machining apparatus in which a degree of rigidity of a drive mechanism is improved as compared with a conventional laser machining apparatus so that a high-speed driving of a machining head can be facilitated without lowering a machining accuracy, thereby efficiently realizing high-precision laser beam machining.

According to the present invention, a parallel drive system is used as at least a part of a machining head moving mechanism in a main machining unit. Namely, in the laser machining apparatus of the present invention, a drive mechanism for moving the machining head includes at least two expandable arms and a motor for extend/contract each expandable arm. Each base of at least two expandable arms is angularly movably supported on a fulcrum, and the machining head is supported by the expandable arms via a coupling mechanism so as to be positioned in dependence on the extension/contraction of the expandable arms.

The number of the expandable arms is practically two or three. In a case where the number of the expandable arms is two, it is preferable to use means (a motor and a moving mechanism connected to the motor) for adjusting a position of a machining nozzle provided on a tip of the machining head in an axial direction of the machining nozzle.

The parallel drive system for moving the machining head may be mounted on a serial drive system. In this case, the number of the expandable arms used in the parallel drive system may be two or three. Though the serial drive mechanism is typically a X-Y serial drive system, it may be a serial drive system for moving the machining head in one-axis direction, i.e. X-axis, Y-axis or Z-axis direction. Et is preferable to use a linear motor for driving the serial drive system.

The laser machining apparatus of the present invention is characterized in that the parallel drive system using a plurality of expandable arms is incorporated in the machining head moving mechanism. With this arrangement, it is possible to increase the degree of substantial rigidity without decreasing a machining range, as compared with the conventional laser machining apparatus. As a result, deterioration of the machining accuracy is hard to occur even if the machining head is moved at a high speed or a high acceleration. Since the movement of the machining head contains a movement at a low speed or a low acceleration (e.g., a constant-speed movement), the serial drive system may be assigned to such movement. According to the invention, the above way of moving the machining head may be adopted by mounting the parallel drive system on the serial drive system.

BRIEF DESCRIPTION OF DRAWINGS

FIGS. 4a, 4b and 4c show a support structure for supporting the machining head at a joint of two expandable arms used in the first embodiment.

FIGS. 6a, 6b and 6c shows a support structure (a coupling structure) for supporting the machining head at a joint of three expandable arms used in the second embodiment.

BEST MODE OF CARRYING OUT THE INVENTION

A basic feature of the present invention is that a parallel drive system is used as a drive system for moving a machining head of a laser machining apparatus. The parallel drive system for the machining head may be a two-dimensional one or a three-dimensional one. The parallel drive system is mounted on a serial X-Y drive system so that a range of movement of the machining head can be expanded. The present invention will be described more in detail with the following three embodiments.

First embodiment: a laser machining apparatus adopting a two-dimensional parallel drive system.

Second embodiment: a laser machining apparatus adopting a three-dimensional parallel drive system.

Third embodiment: a laser machining apparatus adopting a two-dimensional parallel drive system mounted on a serial X-Y drive system.

Figure 2A:
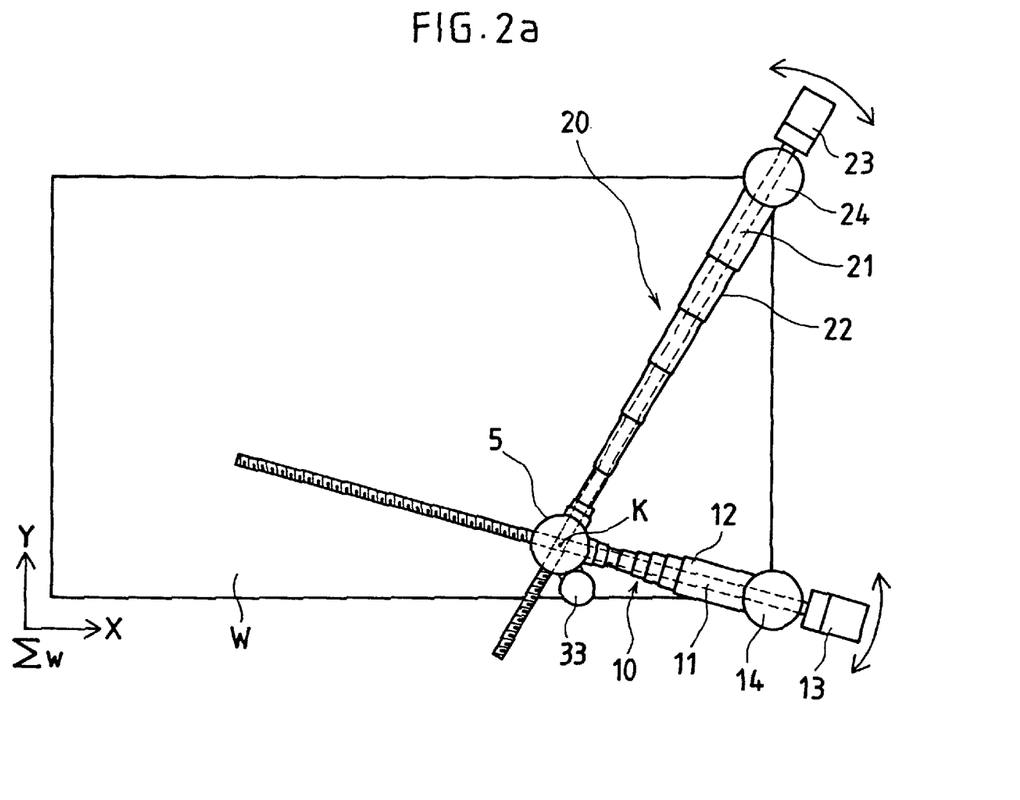
FIGS. 2a and 2b are a top plan view and a side view, respectively, of a main machining unit of a laser machining apparatus, according to a first embodiment of the invention, using a two-dimensional parallel drive system.
Figure 2B:
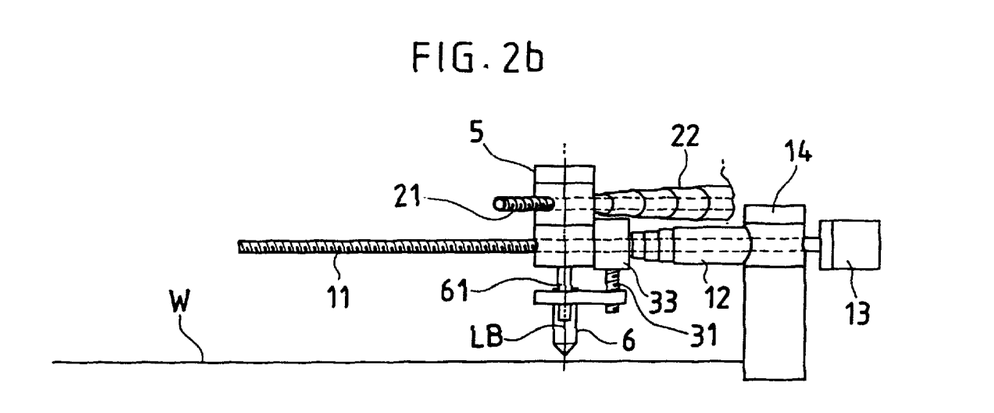

In any of these embodiments, the entire machine except the machining head drive mechanism is not pertinent directly to the technical concept of the present invention and may hence be of the same structure as the conventional laser machining apparatus. Therefore, illustration of the structure in FIG. 2 and following drawings and its related description are substantially concentrated on the principal part of the main machining unit (a machining head, a drive system and associated parts).

First Embodiment

FIGS. 2a and 2b show the structure of a principal part of the machining unit of the laser machining apparatus according to the first embodiment adopting a two-dimensional parallel drive system. In FIGS. 2a and 2b, two expandable arms 10, 20 support a single machining head 5 and are connected by the machining head 5. In the following description, a point (right above a machining nozzle) representing the machining head 5 is referred to as a joint point, an axis represented by the expandable arm 10 is referred to as a first axis and an axis represented by the expandable arm 20 is referred to as a second axis.

The expandable arms 10, 20 supporting the machining head 5 at a joint point K are swingably supported at fulcrums 14, 24, respectively. The swinging movement of the expandable arms 10, 20 is allowed only in a plane parallel to a machining plane at the joint point K, and that in any other directions is hindered. As is described below, the range of the swinging movement of each arm 10, 20 is appropriately limited.

Each arm 10, 20 has a ball screw 11, 21 and a cover 12, 22, and one end of the cover 12, 22 is fixed to the fulcrum 14, 24 and the other end is fixed to the machining head 5. In order to impart expansion/contraction of the arm 10, 20, the cover 12, 22 has an expandable and contractible tubular structure. Specifically, the cover may be a well-known bellows-tube or a telescopic tube which comprises a number of tubular members (e.g., metal tubes) having increasing diameters and connected successively one to another.

Further, the ball screw 11 of the first axis is rotatably supported by the fulcrum 14, and the ball screw 21 of the second axis is rotatably supported by the fulcrum 24. And the machining head 5 has two ball nuts through which the respective ball screws 11, 12 threadedly extend. The support structure of the machining head 5 will be described in detail later. Thus, by operating servo motors 13, 23 connected to the respective ball screws 11, 21, the ball screws 11, 21 are rotated and, in response to the rotation of the ball screws 11, 21, the first-axis and second-axis arms 10, 20 expand or contract.

The position of the machining head 5 supported at the joint point K of the first-axis and second-axis arms 10, 20 is thereby moved. A distance between the fulcrum 14 and the joint point K is determined by the expansion/contraction position of the first-axis arm 10, and a distance between the fulcrum 24 and the joint point K is determined by the expansion/contraction position of the second-axis arm 20. Therefore, a two-dimensional position of the joint point K whose movement is restricted in the plane is determined by these distances. Using this relationship, it is possible to control the position of the machining head 5 supported at the joint point K.

When a workpiece coordinate system Σw having an X-Y plane parallel to the machining plane is defined, the joint point K is movable in a plane parallel to the X-Y plane. When the position of the joint point K representing the position of the machining head 5 is expressed as (x, y), and the X-Y positions of the machining head fulcrums 14, 24 are expressed as (X1, Y1), (X2, Y2), respectively, the following equations are established.

$$(x-X1)^2+(y-Y1)^2=L1^2 \quad (1)$$

$$(x-X2)^2+(y-Y2)^2=L2^2 \quad (2)$$

In these equations, L1 represents a distance between the fulcrum 14 and the joint point K, and L2 represents a distance between the fulcrum 24 and the joint point K. L1 is a function of the position of rotational movement of the servo motor 13 for driving the first axis and L2 is a function of the position of rotational movement of the servo motor 23 for driving the second axis. Assuming that these functions are represented by f1, f2, respectively and variables representing the rotational positions of the servo motors 13, 23 are J1, J2, respectively, the following equations are established:

$$L1=f1(J1) \quad (3)$$

$$L2=f2(J2) \quad (4)$$

A concrete form of f1, f2 is determined by calculation based on design values or an appropriate calibration.

Using the above relationship, it is possible to move the machining head 5 to a desired position within the variation of the length of the arm 10, 20. By controlling the length of the arm 10, 20 continuously, it is also possible to move the machining head 5 along a desired path. The position (x, y) of the machining head 5 corresponding to a desired machining path is calculated in the numerical controller based on the machining program data so that a motion command for realizing the arm length L1, L2 corresponding to the calculated position is created, and the servo motors 13, 23 are operated based on the motion command. The above equations (1)–(4) are basic equations for creating the motion command based on the position (x, y) of the machining head 5.

Figure 3A:
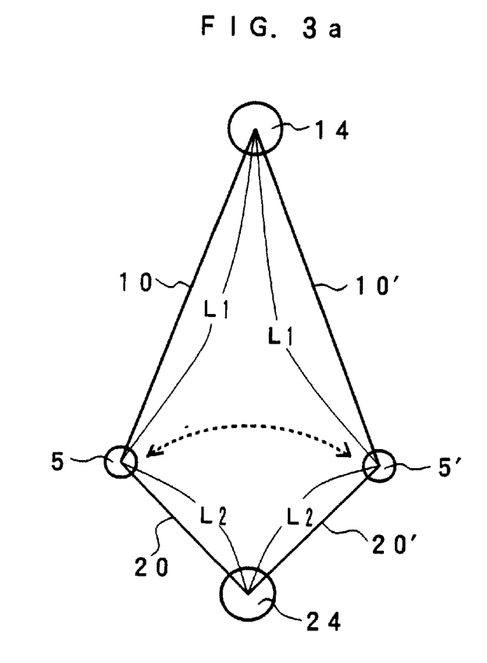
FIG. 3a is a diagram showing a case where a position of a machining head is not univocally determined even when lengths of first and second axes are given.
Figure 3B:
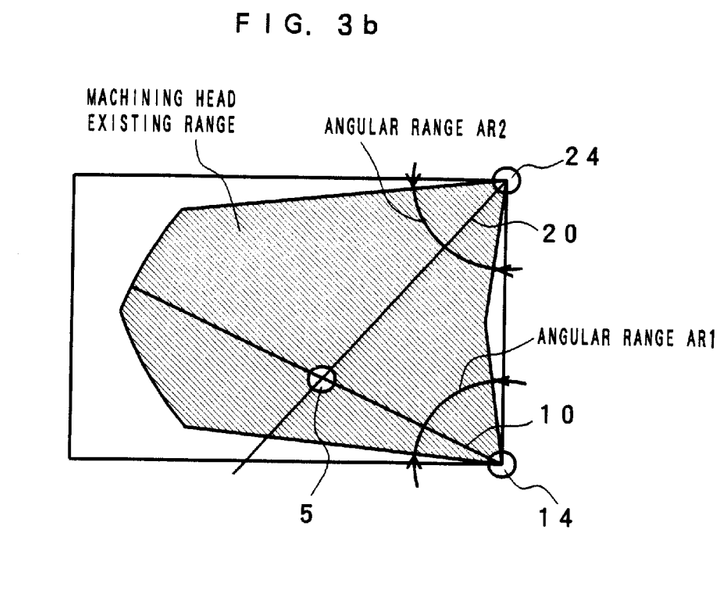
FIG. 3b is a diagram showing an angular range limit for univocally determining the position of the machining head in the embodiment shown in FIG. 2.

Although the fulcrums 14, 24 may be arranged basically in desired positions as long as they are not coincide with each other, they are arranged usually with an appropriate distance as shown in FIG. 2a. There is a case where it is impossible to univocally determine the position of the machining head 5 by controlling the lengths L1, L2 of the first and second axes. FIG. 3a shows the case where the machining head position designated by either of reference numeral 5, 5' satisfies the condition that the length from the fulcrum 14 is L1 and the length from the fulcrum 24 is L2. As a measure to cope with the problem that the position of the machining point has two values, it may be considered that a range of the angular movement of at least one of the arms 10, 20 is restricted. FIG. 3b shows an example of giving a restriction to the angular movement with respect to the embodiment shown in FIG. 2.

In the example of FIG. 3B, by restricting a range AR1 of the angular movement of the arm 10 about the fulcrum 14 and a range AR2 of the angular movement of the arm 20 about the fulcrum 24 to the illustrated ranges (each range slight smaller than 90 degrees), a range of position of the machining head 5, which is indicated by hatching, is realized, avoiding the two-value problem.

In the actual machining, it is often necessary to adjusting the distance between the machining head 5 and a workpiece surface in accordance with the machining condition or to move the machining head 5 to conform an undulation of the machining surface. However, there is no function of adjusting Z-axis position in the parallel drive system using only two expandable arms.

In this embodiment, a Z-axis adjusting mechanism composed of a Z-axis adjusting bail screw 31 and a servo motor 33 is disposed between the joint of the machining head 5 with the arms 10, 20 and the machining nozzle 6 forming a machining head tip, thereby it is possible to adjust the position in the Z-axis direction (toward and away from the machining surface). An amount of the adjustment of the Z-axis position is determined by the numerical controller (not shown) for controlling the servo motor 33.

A YAG laser or a carbon-dioxide gas laser may be used as the laser oscillator. When a YAG laser is used, optical fibers can be used in transmitting laser beam from the laser oscillator to the machining nozzle. In a case where a carbon-dioxide gas laser is used, optical fibers can not be used in transmitting laser beam and in such case by providing mirrors fixed at the fulcrum of one of the arms and at the joint of the arms with the machining head so as to angularly move with the arm, transmission of light is possible.

In the latter case, if the mirrors are mounted in the covers of the arms, the arm covers serve also as protect covers for preventing laser beam from inadvertently entering an eye of a person. In such event, the ball screws may be hollow or may be disposed outside the arms.

It is preferable that the length of the arm (the length of the bail screw) is determined in view of the rigidity of the drive system and the range of machining. Generally, by setting the length of the arm long, the range of machining is widened, but since the machine rigidity is decreased, the machining accuracy is lowered. To the contrary, by setting the length of the arm short, the range of machining is narrowed, but since the machine rigidity is increased, it is advantageous in improving the machining accuracy. In this embodiment, a maximum arm length is set to 1.2 m, as a practical example.

Figure 4A:
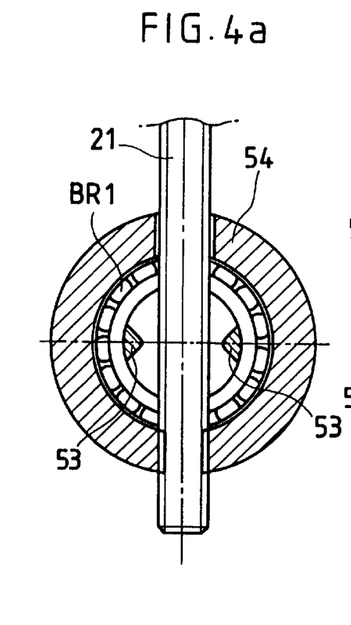
FIG. 4a is a cross-sectional view taken along a line IV—IV in FIG. 4b.

The support structure for supporting the machining head 5 at the joint point K of the two expandable arms 10, 20 used in the first embodiment will be described referring to FIGS. 4a–4c.

Figure 4B:
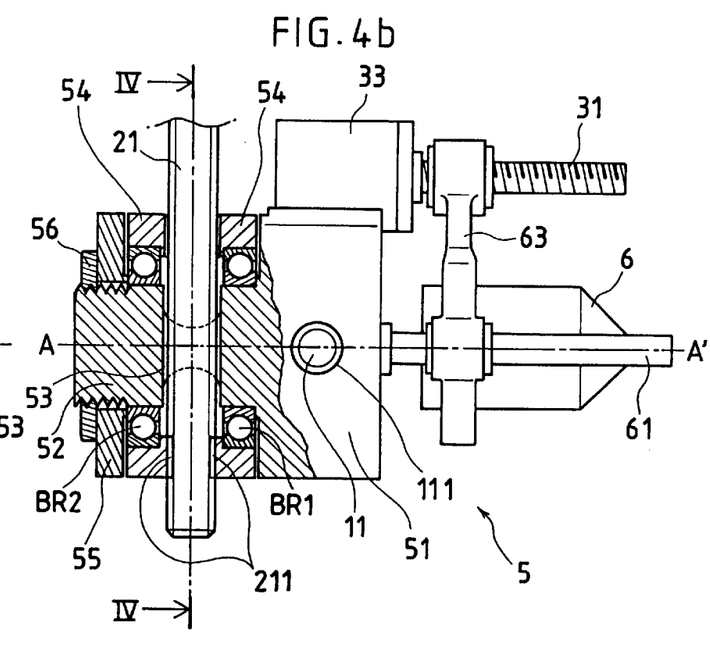
FIG. 4b is a view, with parts broken away, of the machining head of FIGS. 2a and 2b.
Figure 4C:
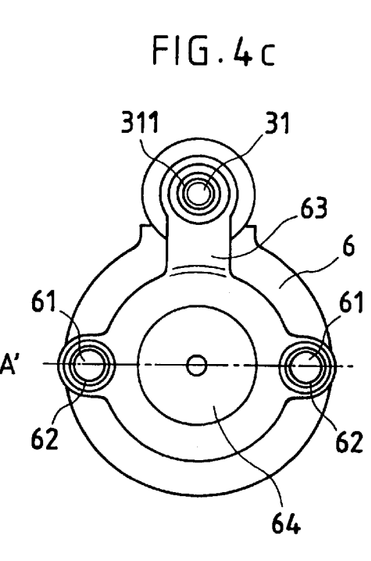
FIG. 4c is a side view of the structure as shown in FIG. 4b as viewed from a tip of a machining nozzle 6.

First, as particularly shown in FIG. 4b, the machining head 5 comprises a machining-head base 51 having a ball nut 111 threadedly engaged with the first-axis ball screw 11. With this arrangement, the base 51 can move (expansion/contraction movement of the first axis) in the expansion/contraction direction of the first axis (in the direction of axis of the ball screw 11).

On the other hand, a ball nut 211 is formed on an inner surface of a ball screw fitting hole of a second-axis machining-head outer tube 54 surrounding the second-axis ball screw 21 and is threadedly engaged with the ball screw 21.

A bearing BR1 is provided between the machining-head outer tube 54 and the machining-head base 51, and a bearing BR2 is provided between the machining-head outer tube 54 and the machining-head end 52. The machining-head outer tube 54 is thereby rotatably mounted on the machining-head base 51 and the machining-head end 52.

As is understood from FIG. 4a, the machining-head end 52 is integrally connected to the machining-head base 51 by connecting portions 53 which are formed not to interfere with the ball screw 21. A lid member 55 covers the second-axis machining-head outer tube 54 and the bearing BR2 and is secured to the machining-head end 52 by a nut 56 threadedly engaged with a thread portion of the machining-head end 52.

Likewise the expansion/contraction of the first axis, by operating the servo motor 23 (see FIG. 2), the ball screw 21 is driven to move the bail nut 211 (expansion/contraction movement of the second axis) in the direction of expansion/contraction of the second axis (in the direction of axis of the ball screw 21). For moving the machining head 5, the first axis and/or the second axis are driven to cause L1 and/or L2 to vary. At that time, as is readily understood from FIG. 2a, an angle between the ball screw 11 and the ball screw 21 generally varies. Referring to FIG. 4b, relative postures of the two ball screws about axis A-A' vary.

Specifically, regarding the postures about axis A-A', the base 51 follows the posture variation of the ball screw 11 with the ball nut 111, and the outer tube 54 follows the posture variation of the ball screw 21 with the ball nut 211. The posture variation of the ball screw 11 and the posture variation of the ball screw 21 do not coincide with each other except a special condition. Therefore, variation of the relative postures about axis A-A' should be allowed between the machining-head base 51 which moves with the ball nut 111 and the outer tube 54 which moves with the ball nut 211. The structure including the bearings BR1, BR2 gives a degree of freedom of rotation in order to make the above variation possible. The position and size of the connecting portion 53 shown in FIG. 4a are designed so as to allow the movement range of the machining head 5 which is shown in FIG. 3b.

The vertical position adjustment (Z-axis position adjustment) of the machining head 5 is accomplished by vertically adjusting the machining nozzle 6 provided on the tip of the machining head 5, with respect to the machining-head base 51. A servo motor 33 is mounded on a side portion of the base 51 for vertical adjustment. The servo motor 33 is connected to a vertical-adjustment ball screw 31 and a ball nut 311 fixed to a machining-nozzle support member 63 is threadedly engaged with the ball screw 31. The machining-nozzle support member 63 is guided axially by a linear guide 61 received in a guide hole 62. With this structure, the ball screw 31 is rotatably driven by the servo motor 33 so that vertical movement (Z-axis position adjustment) of the machining nozzle 6 is achieved.

Second Embodiment

Figure 5A:
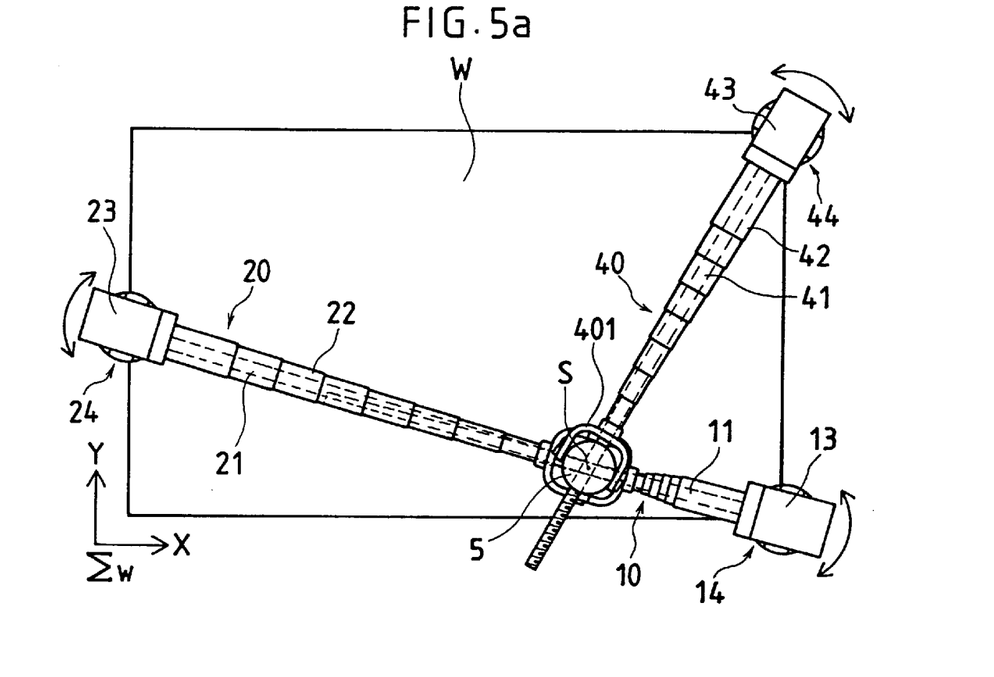
FIGS. 5a and 5b are a top plan view and a side view of a main machining unit of a laser machining apparatus, according to a second embodiment of the invention, using a three-dimensional parallel drive system.
Figure 5B:
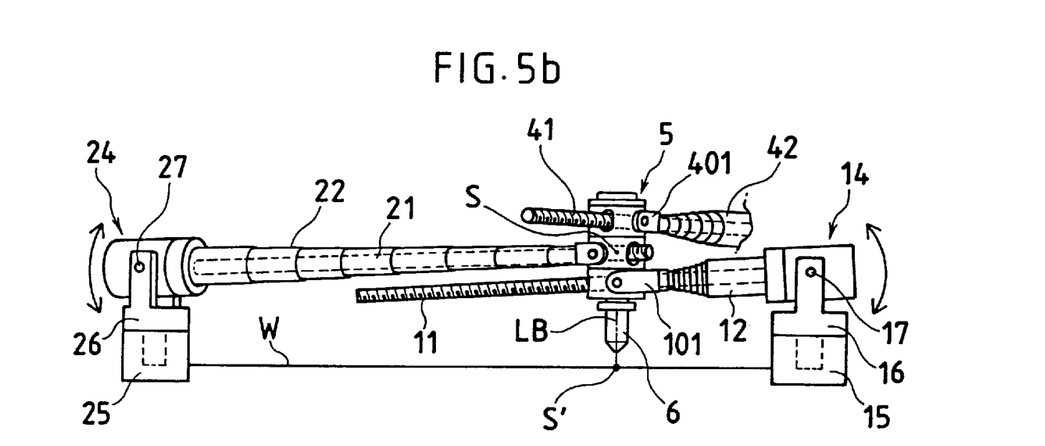

FIGS. 5a and 5b show a structure of a principal part of the machining unit of the laser machining apparatus according to the second embodiment adopting a three-dimensional parallel drive system. In FIGS. 5a and 5b, a single machining head 5 is supported by a joint point S of three expandable arms 10, 20, 40. In the following description, an axis of the expandable arm 10 is referred to as a first axis, an axis of the expandable arm 20 is referred to as a second axis and an axis of the expandable arm 40 is referred to as a third axis.

Each arm 10, 20, 40 has a ball screw 11, 21, 41 and a cover 12, 22, 42 and one end of the cover 12, 22, 42 is fixed to a fulcrum 14, 24, 44 and the other end thereof is fixed to the machining head 5. Likewise in the first embodiment, the cover 12, 22, 42 has an expandable/contractible tubular structure in order to impart expansion/contraction of the arm 10, 20, 40. Specifically, the tubular structure may be a conventional bellows tube or a telescopic tube which comprises a number of tubular members (e.g., metal tubes) having increasing diameter and connected successively one to another.

Respective bases of the expandable arms 10, 20, 40 of the first through third axes which support the machining head 5 at a joint point S are connected to the corresponding fulcrums 14, 24, 44 by couplings. The fulcrum of each axis has a coupling for allowing an angular movement of the respective expandable arm 10, 20, 40 (the ball screw 11, 21, 41 and the cover 12, 22, 42) about the Z axis (vertical axis) and an angular movement about the horizontal axis. More specifically, as shown in FIG. 5b, the first-axis fulcrum 14 has a support post 15 and a support-post-side rotary shaft 16 rotatable about the axis of the support post 15, and a support-post-side swing arm shaft 17 is mounted on the rotary shaft 16. On the swing arm shaft 17, the ball screw 11 is pivotally supported. Thus, a two-degree-freedom coupling is constructed for allowing the first-axis expandable arm 10 to angularly move about the vertical axis and the horizontal axis.

Likewise, the fulcrum 24 of the second axis has a support post 25 and a support-post-side rotary shaft 26, and a support-post-side swing arm shaft 27 is mounted on the rotary shaft 26. On the swing arm shaft 27, the ball screw 21 is pivotally supported. Thus, a two-degree-freedom coupling is constructed for allowing the second-axis expandable arm 20 to angularly move about the vertical axis and the horizontal axis. Although the structure of the third-axis fulcrum 44 is not shown in the drawings, the angular movement about the vertical axis and the horizontal axis is allowed by the same coupling structure.

In a machining-head-side support structure of the each arm 10, 20, 40 of the laser machining apparatus using the three-axes expandable arms, two axes of three axes has a two-degree freedom of angular movement (about the vertical axis and the horizontal axis) likewise the fulcrum-side support structure, while the remaining one axis has a single-degree freedom for pivotal movement (about the horizontal axis). In this embodiment, the machining-head-side coupling of each of the second and third axes is in the form of a combination of a rotary shaft about the vertical axis and a swing arm about the horizontal axis likewise the fulcrum-side coupling, and the coupling of the first axis is a single-degree-freedom coupling comprising only a sing arm 101 about the horizontal axis without a degree of freedom for angular movement about the vertical axis.

The reason why such restriction to the degree of freedom of angular movement is given is that, if an excessive degree of freedom of angular movement is given to the machining-head-side joint, the posture of the machining head 5 would be non-stable, so that a constant posture (with the machining nozzle 6 directed vertically downwardly) is difficult to maintain. For example, if a two-degree freedom of angular movement is given to every axis, namely, if the angular movement about the vertical axis is given to the first axis in the above-mentioned structure, the degree of freedom would become excessive, so that it would be practically impossible to keep the machining head 5 in a constant posture.

Each ball screw 11, 21, 41 of the first through third axes is driven by a servo motor 13, 23, 24 mounted in each arm base, like each ball screw of the first and second axes of the first embodiment. By operating these servo motors, the ball screws 11, 21, 41 are rotated so that the first-axis arm 10, the second-axis arm 20 and the third-axis arm 40 expand/contract in response to the rotation of these ball screws.

The position of the machining head 5 represented by the joint point S of the three arms is thereby moved. Each length between the respective fulcrum 14, 24, 44 and the joint point S is determined by the expansion/contraction position of each arm 10, 20, 40. Therefore, the three-dimensional position of the joint point S satisfies these length conditions. Utilizing this relation, it is possible to control the position of the supported machining head 5. In the second embodiment using a three-dimensional drive system, like the first embodiment, an appropriate restriction is given to a range of the angular movement for the arms, in view of the case where the position of the machining head is not univocally determined by the expansion/contraction position of the arms.

When a workpiece coordinate system $\Sigma w$ having an X-Y plane parallel to the machining plane is defined, it is assumed that projection of three arms 10,20, 40 onto the X-Y plane crosses always at one point S', irrespective of the expansion/contraction position of the individual arms 10, 20, 40. Since this point S' is a point corresponding to the machining point (the striking point of laser beam LB), the joint point S representing the position of the machining head 5 can be regarded as a fixed point on the machining head 5, which is positioned right above the point S' With this premise, the position of the joint point S representing the position of the machining head 5 is expressed as (x, y, z), the X-Y-Z positions of the machining-head fulcrums 14 are expressed as (X1, Y1, Z1), (X2, Y2, Z2), (X3, Y3, Z3), respectively, then the following relation is established.

$$(x-X1)^2+(y-Y1)^2+(z-Z1)^2=L1^2 \qquad (5)$$

$$(x-X2)^2+(y-Y2)^2+(z-Z2)^2=L2^2 \qquad (6)$$

$$(x-X3)^2+(y-Y3)^2+(z-Z3)^2=L3^2 \qquad (7)$$

In these equations, L1 represents a distance between the fulcrum 14 and the joint point S, L2 represents a distance between the fulcrum 24 and the joint point S, and L3 represents a distance between the fulcrum 44 and the joint point S. L1, L2, L3 are a function of the rotational position of the servo motor 13 for driving the first axis, a function of the rotational position of the servo motor 23 for driving the second axis, and a function of the rotational position of the servo motor 43 for driving the third axis, respectively.

Assuming that the above functions are represented by g1, g2, g3 and variables representing the respective rotational positions of the servo motors 13, 23, 43 are J1, J2, J3, the following equations are established.

$$L1=g1(J1) \qquad (8)$$

$$L2=g2(J2) \qquad (9)$$

$$L2=g3(J3) \qquad (10)$$

A concrete form of g1, g2, g3 is determined by calculation based on design values or an appropriate calibration.

Using the above relationship, it is possible to move the machining head 5 to a desired position (three-dimensional position) within the variation of the length of the arm 10, 20, 40. By controlling the length of the arm 10, 20, 40 continuously, it is also possible to move the machining head 5 three-dimensionally along a desired path. The position (x, y, z) of the machining head 5 corresponding to a desired machining path is calculated in the numerical controller based on the machining program data so that a motion command for realizing the arm length L1, L2 corresponding to the calculated position is sent to the servo motors 13, 23, 44. The above equations (5)–(10) are basic equations for creating the motion command from the position (x, y, z) of the machining head 5.

In the second embodiment using the three-dimensional parallel drive system, although the fulcrums 14, 24, 44 can be disposed basically in desired positions as long as they are not aligned in a straight line, they (strictly speaking, their projection onto the X-Y plane) are usually arranged with an appropriate distance from one another as shown in FIG. 5a.

In this embodiment, unlike the first embodiment, it is unnecessary to provide a drive unit (including a servo motor 33) for vertical position adjustment on the machining head 5, and therefore it is possible to reduce weight of the whole machining head. The rigidity of the drive system is improved as compared with the laser machining apparatus of the first embodiment, so that it is advantageous in securing high machining accuracy. As the laser beam oscillator to be used and the way of transmitting the laser beam are identical with those of the first embodiment, their description is omitted here.

Figure 6A:
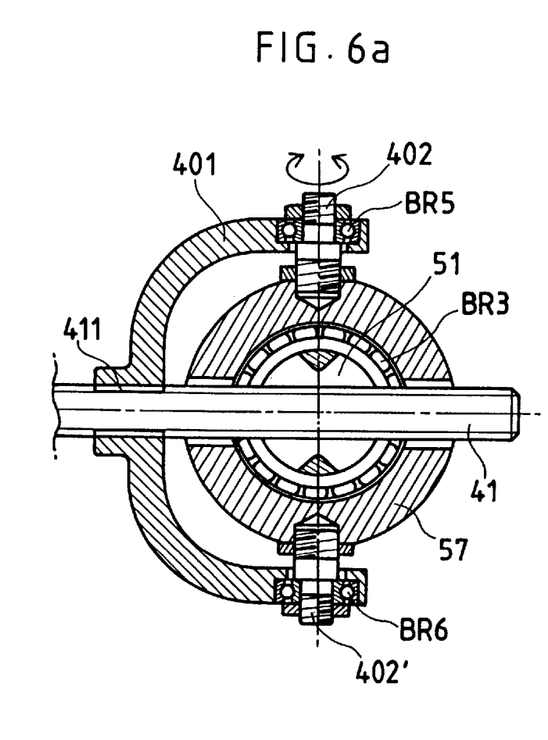
FIG. 6a is a cross-sectional view taken along a line VI—VI in FIG. 6b.

The support structure for supporting the machining head 5 at the joint point of the three expandable arms 10, 20, 40 used in the second embodiment will be described referring to FIGS. 6a and 6b.

Figure 6B:
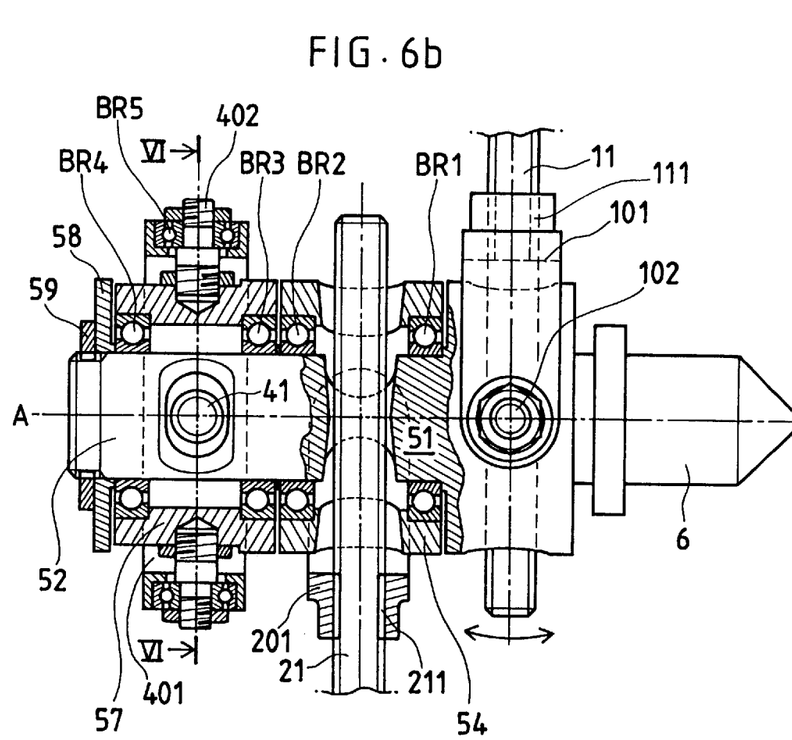
FIG. 6b is a view, with parts broken away, of the machining head shown in FIG. 5.

First, as particularly shown in FIG. 6b, the machining head 5 comprises a machining-head base 51 through which a first-axis ball screw 11 is inserted via a coupling having one degree of freedom of angular movement. Specifically, a swing arm 101 is pivotally supported on a machining-head-side swing arm rotary shaft 102 of the base 51, and a ball nut 111 threadedly engaged with the ball screw 11 is provided inside the swing arm 101.

Accordingly, when the ball screw 11 is driven by the servo motor 13 shown in FIG. 5, the swing arm 101 is moved (expansion/contraction movement of the first axis) in the direction of expansion/contraction of the first axis (in the direction of axis of the ball screw 11). With this arrangement, when the ball screw 11 is angularly moved about the support-post-side swing arm shaft 17 (see FIG. 5b), the posture of the machining head 5 (directed vertically downwardly) is not affected by this angular movement. The degree of freedom of angular movement of the machining-head-side coupling of the first axis is one, so that the posture of the machining head 5 is restricted with respect to the angular movement of the ball screw 11 about the support-post-side rotary shaft 16 (see FIG. 5b), thereby causing the machining nozzle 6 to angularly move about an axis A-A' (vertically downwardly).

Likewise the first axis, a second-axis machining-head outer tube 54 surrounding the second-axis ball screw 21 is equipped with a swing arm 201, and a ball nut 211 threadedly engaged with the ball screw 21 is provided inside the swing arm. Accordingly, when the ball screw 21 is driven by the servo motor 23 shown in FIG. 5, the second-axis swing arm is moved (expansion/contraction movement of the second axis) with the outer tube 54 in the expansion/contraction direction of the second axis (in the direction of an axis of the ball screw 21).

When the ball screw 21 is angularly moved about the support-post-side swing arm shaft of the second axis in moving the machining head 5, the posture of the machining head 5 is not affected by such angular movement. Likewise in the first embodiment, the machining head end 52 is connected to the machining-head base 51 by a connecting portion (not shown) formed not to interfere with the ball screw 21. The outer tube 54 is allowed to rotate (about axis A-A') relative to the base 51 and the machining-head end 52 by means of bearings BR1 and BR2. Therefore, the posture of the outer tube about axis A-A' and the posture of the base 51 about axis A-A' do not restrict each other.

A third-axis machining-head outer tube 57 is rotatably mounted on the machining-head end 52 via bearings BR3, BR4. As is understood particularly from FIG. 6a, a machining-head-side swing arm 401 of the third axis is pivotally supported on the outer tube 57 via swing arm rotary shaft 402, 402'. These bearings BR3, BR4 and swing arm 401 constitute a coupling having a two-degree of freedom of angular movement.

A ball nut 411 provided on the swing arm 401 is threadedly engaged with the ball screw 41 of the third axis. Therefore, when the ball screw 41 is driven by the servo motor 43 shown in FIG. 5, the swing arm 401 of the third axis is moved (expansion/contraction movement of the third axis) in the direction of expansion/contraction of the third axis (in the direction of axis of the ball screw 41) with the outer tube 57. When the ball screw 41 is angularly moved about the support-post-side swing arm shaft of the third axis in moving the machining head 5, the posture of the machining head 5 is not affected by such angular movement.

The outer tube 57 is allowed to rotate (about an axis A-A') relative to the machining-head rotary shaft 52 by the bearings BR3, BR4. Thus, the posture of the outer tube 57 about the axis A-A' and the posture of the machining-head rotary shaft 52 about the axis A-A' do not restrict each other.

A lid member 58 is provided to cover the third-axis machining-head outer tube 57 and the bearing BR4 and is secured by a nut 59 threadedly engaged with a thread portion of the machining-head end 52. Further, bearings BR5, BR6 pivotally support the swing arm 401 on the third-axis machining-head outer tube 57 by the rotary shafts 402, 402'. Also for pivotal supporting of the first-axis swing arm 101 on the machining-head base 51 and pivotal supporting of the second-axis swing arm on the second-axis machining-head outer tuber 54, the same bearings are used.

With the above-mentioned structure, a degree of freedom of motion required on the side of each fulcrum 14, 24, 44 and on the side of the machining head 5 when the arms 10, 20, 40 are expanded/contracted under such a condition as to maintain the posture (with the machining nozzle 6 directed vertically downwardly) of the machining head 5 is wholly guaranteed. Therefore, by controlling of the servo motors 13, 23, 43 of the individual axes according to the basic equations (5)–(8), smooth three-dimensional positioning of the machining head 5 can be achieved.

Third Embodiment

Figure 7:
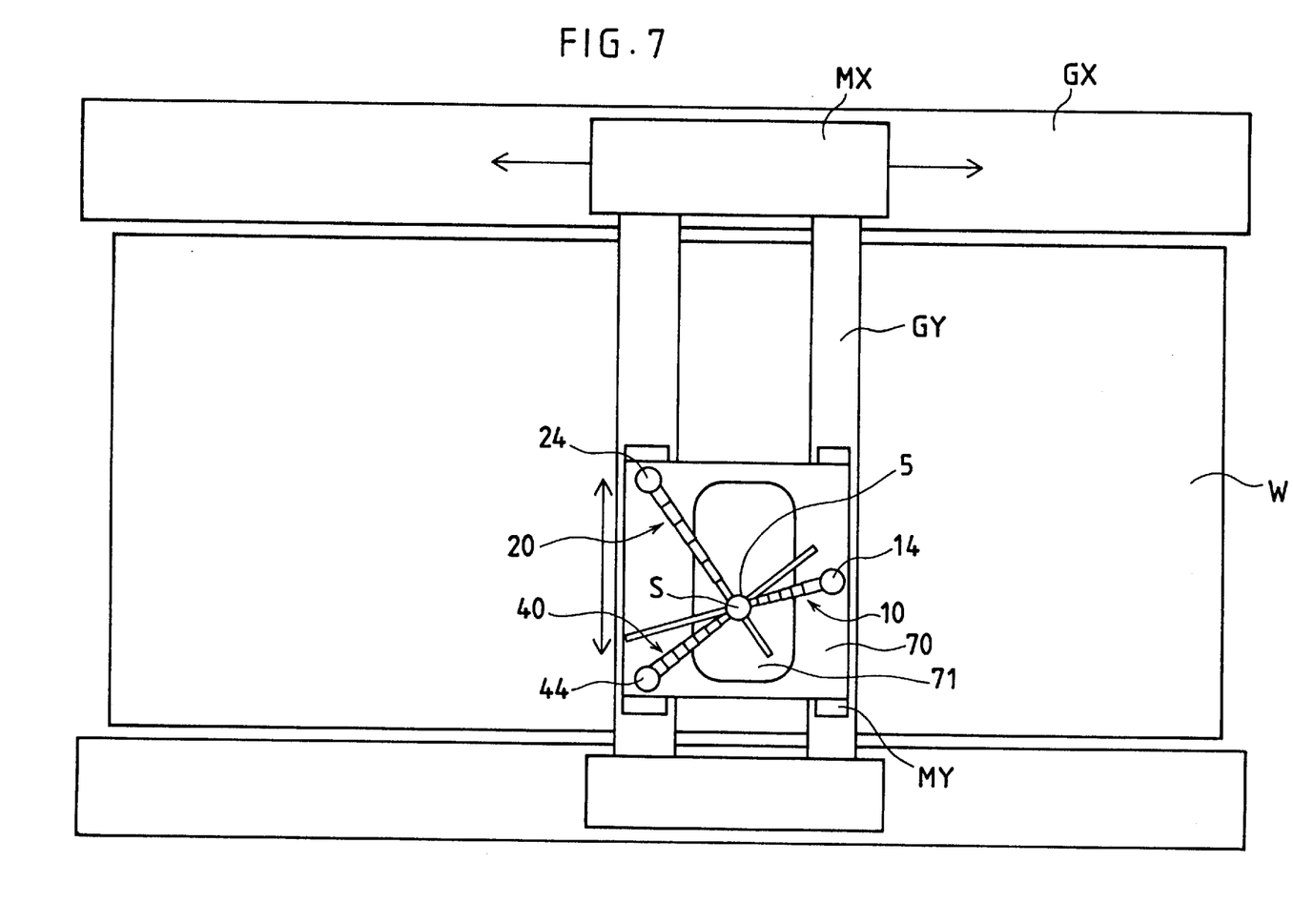
FIG. 7 is a top plan view of a main machining unit of a laser machining apparatus according to a third embodiment.

FIG. 7 shows a principal structure of a machining unit of a laser machining apparatus according to a third embodiment. In this embodiment, the third-dimensional parallel drive system is carried on the serial X-Y drive system to expand the machining range of the laser machining apparatus. The structure and function of the parallel drive system are basically identical with those described in connection with the second embodiment. Also, the serial X-Y drive system itself is of the well-known type.

In FIG. 7, the three-dimensional parallel drive system is mounted on a parallel-drive-system-carrying table 70 having a Y-axis-driving linear motor MY. By operating the Y-axis-driving linear motor MY, the table 70 is moved on a Y-axis linear guide GY. Further, the Y-axis linear guide GY is equipped with an X-axis-driving linear motor MX and by operating the X-axis-driving linear motor MX, the Y-axis linear guide GY carrying the table 70 is moved on an X-axis guide GX. Each linear motor MX, MY is connected to a numerical controller so that its position is controlled by the numerical controller.

On the parallel-drive-system-carrying table 70, the fulcrums 24, 24, 44 for expandable arms 10, 20, 40 for the first-axis, second-axis and third axis are mounted and a single machining head 5 is supported at a joint point S of the three expandable arms 10, 20, 40. As is described in the second embodiment, each arm 10, 20, 40 comprises a ball screw and a cover, and one end of each cover is connected to a fulcrum 14, 24, 44 and the other end thereof is connected to the machining head 5.

In order to impart expansion and contraction of the individual arm 10, 20, 40, each cover has an expandable and contractible tubular structure likewise in the first and second embodiments. The arms 10, 20, 40 supporting the machining head 5 at the joint point S are connected to the machining head 5 and the respective fulcrums 14, 24, 44 using couplings. As the structure and function (degree of freedom of angular movement) of each coupling are as described in connection with the second embodiment, their description is omitted here.

Likewise in the second embodiment, in response to expansion/contraction of the arms 10, 20, 40, the position of the machining head 5 represented by the joint point S is moved. The movement of the machining head 5 in response to expansion and contraction of the arms 10, 20, 40 in the third embodiment takes place on the parallel-drive-system-carrying table 70. In order to enable approaching the machining head 5 to a workpiece W and radiating laser beam to the workpiece W, an opening 71 is formed substantially centrally in the parallel-drive-system-carrying table 70. The size and shape of the opening 71 are designed so as to adequately cover the range of movement of the machining head 5.

As is described in connection with the second embodiment, each distance between each fulcrum 14, 24, 44 and the joint point S is determined by the expansion/contraction position of the respective arm 10, 20, 40. Accordingly, the three-dimensional position of the joint point S satisfies these distance conditions. Using this relation, it is possible to control the position of the supported machining head 5. Likewise in the first and second embodiments, the range of the angular movement of the arms 10, 20, 40 is appropriately restricted, considering a case where the position of the machining head is not univocally determined by the expansion/contraction position of the arms.

Since the laser machining apparatus of this embodiment has the serial drive system and the parallel drive system in combination, it is possible to selectively use either system depending on the mode of movement of the machining head 5. Namely, the serial drive system may be used for a low-speed or a constant-speed movement which does not require a large acceleration, while the parallel drive system may be used for a high-speed movement with a large acceleration or a path movement with a large curvature. By driving the serial drive system at a constant speed and at the same time by driving the parallel drive system at a high speed (high acceleration), it is possible to carry out a wide-range machining at high precision without difficulty. As long as it is used under such low-acceleration condition, the low rigidity of the serial drive system would not be a problem.

Further, even for a large workpiece such that the range of machining is inadequate with the laser machining apparatus of the first and second embodiments, it is possible to ensure a substantially large machining range by repeating a process of causing such a movement as to roughly select a machining head position using the serial drive system; starting the parallel drive system after the serial drive system is temporarily stopped; and carrying out the machining around the machining head while moving the machining head. Also in this case, it is possible to carry out the machining at high speed with high precision in moving by the parallel drive system. If the above method is adopted, it is preferable that the serial drive system has such a degree of rigidity that no vibration occurs when the serial drive system starts and stops.

In this embodiment, since it is unnecessary to excessively expand the expandable arms 10, 20, 40 of the parallel drive system in order to secure a large machining range, both a large machining range and an adequate machining accuracy are easy to achieve. The parallel drive system to be carried on the serial drive system may be the type described in connection of the first embodiment. Further, if a machining range for an elongated narrow workpiece or a large position adjustment only in the Z-axis direction is required, a one-dimensional serial drive system may of course be used. As the laser beam oscillator to be used and the way of transmitting laser beam are identical with those of the first and second embodiment, their description is omitted here.

With the laser machining apparatus of the present invention, it is possible to carry out a high-speed machining while maintaining a high machining accuracy since it has such a structure that a substantial degree of rigidity is increased without narrowing the machining range, as compared with the structure of the conventional laser machining apparatus.

We claim:

1. A laser machining apparatus comprising:
   a machining head to project a laser beam onto a workpiece;
   a main machining unit having a drive mechanism to move said machining head, wherein said drive mechanism comprises at least two expandable arms and motors for extending and contracting said at least two expandable arms, a base of each said expandable arm is angularly movably supported on a fulcrum, and said machining head is supported on said at least two expandable arms via a coupling mechanism so as to be positioned in dependence on the extension or contraction of said at least two expandable arms, wherein each of said at least two expandable arms includes a screw shaft rotationally driven by each of said motors and said coupling mechanism being engaged with threads with said screw shaft.

2. A laser machining apparatus according to claim 1, wherein the number of said expandable arms is two.

3. A laser machining apparatus according to claim 2, wherein means for adjusting a position of a machining nozzle provided on a tip of said machining head in an axial direction of said machining nozzle is mounted on said machining head.

4. A laser machining apparatus according to claim 1, wherein the number of said expandable arms is three.

5. A laser machining apparatus comprising:
   a machining head to project a laser beam to a workpiece;
   a main machining unit having a drive mechanism for moving said machining head, wherein said drive mechanism comprises a parallel drive system and a serial drive system carrying said parallel drive system, said parallel drive system comprises at least two expandable arms and motors to extend and contract said at least two expandable arms, a base of each said expandable arm is angularly movably supported on a fulcrum, and said machining head is supported on said at least two expandable arms via a coupling mechanism so as to be positioned in dependence on the extension or contraction of said at least two expandable arms, wherein each of said at least two expandable arms includes a screw shaft rotationally driven by each of said motors and said coupling mechanism being engaged with threads with said screw shaft.

6. A laser machining apparatus according to claim 5, wherein the number of said expandable arms is two.

7. A laser machining apparatus according to claim 5, wherein the number of said expandable arms is three.

8. A laser machining apparatus according to claim 5, wherein said serial drive system comprises an X-Y serial drive system.

9. A laser machining apparatus according to claim 5, wherein a linear motor is used as a drive source for driving said serial drive system.

10. A laser machining apparatus comprising:
    a machining head to project a laser beam onto a workpiece; and
    a main machining unit having a drive mechanism to move said machining head, wherein said drive mechanism comprises at least three expandable arms and motors to extend and contract said at least three expandable arms, a base for each said expandable arm is angularly movably parallel to a plane of said workpiece supported on a fulcrum, said fulcrum pivotable to move said expandable arms and said machining head perpendicular to said plane of said workpiece, and said machining head is supported on said at least three expandable arms via a coupling mechanism so as to be positioned in dependence on the extension or contraction of said at least three expandable arms, whereby said machining head can be moved in the plane parallel to the workpiece and perpendicular to the plane parallel to the workpiece so that the machining head may be placed closer or further from said workpiece.

11. A laser machining apparatus according to claim 10, wherein means for adjusting a position of a machining nozzle provided on a tip of said machining head in an axial direction of said machining nozzle is mounted on said machining head.

12. A laser machining apparatus according to claim 10, wherein the number of said expandable arms is three.

13. A laser machining apparatus comprising:
    a machining head to project a laser beam to a workpiece; and
    a main machining unit having a drive mechanism for moving said machining head, wherein said drive mechanism comprises a parallel drive system and a serial drive system carrying said parallel drive system, said parallel drive system comprises at least three expandable arms and motors to extend and contract said at least three expandable arms, a base of each said expandable arm is angularly movable parallel to a plane of said workpiece supported on a fulcrum, said fulcrum is pivotable to move said expandable arms and said machining head perpendicular to said plane of said workpiece, and said machining head is supported on said at least three expandable arms via a coupling mechanism so as to be positioned in dependence on the extension or contraction of said at least two expandable arms, whereby said machining head can be moved in the plane parallel to the workpiece and perpendicular to the plane parallel to the workpiece so that the machining head may be placed closer or further from said workpiece.

14. A laser machining apparatus according to claim 13, wherein the number of said expandable arms is three.

15. A laser machining apparatus according to claim 13, wherein said serial drive system comprises an X-Y serial drive system.

16. A laser machining apparatus according to claim 13, wherein a linear motor is used as a drive source for driving said serial drive system.

* * * * *